United States Patent
Chu et al.

(10) Patent No.: US 10,212,730 B1
(45) Date of Patent: Feb. 19, 2019

(54) PARTIAL ASSOCIATION IDENTIFIER (AID) LENGTH CHANGE NOTIFICATION

(71) Applicant: Marvell International Ltd., Hamilton (BM)

(72) Inventors: Liwen Chu, San Ramon, CA (US); Yakun Sun, San Jose, CA (US); Lei Wang, San Diego, CA (US); Jinjing Jiang, San Jose, CA (US); Hongyuan Zhang, Fremont, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 106 days.

(21) Appl. No.: 15/488,162

(22) Filed: Apr. 14, 2017

Related U.S. Application Data (60) Provisional application No. 62/322,742, filed on Apr. 14, 2016.

(51) Int. Cl.
    *H04W 74/00* (2009.01)
    *H04L 5/00* (2006.01)
    *H04W 24/08* (2009.01)
    *H04W 84/12* (2009.01)

(52) U.S. Cl.
    CPC ........... *H04W 74/002* (2013.01); *H04L 5/005* (2013.01); *H04W 24/08* (2013.01); *H04W 84/12* (2013.01)

(58) Field of Classification Search
    None
    See application file for complete search history.

(56) References Cited

U.S. PATENT DOCUMENTS

| | | | | |
|---|---|---|---|---|
| 8,326,372 | B2* | 12/2012 | Raissinia | H04W 52/0216 455/572 |
| 10,080,222 | B1* | 9/2018 | Chu | H04W 72/044 |
| 2005/0188360 | A1* | 8/2005 | de Jong | G06Q 20/341 717/136 |
| 2011/0282961 | A1* | 11/2011 | Montemurro | H04L 63/0892 709/207 |
| 2014/0003399 | A1* | 1/2014 | Liu | H04W 4/08 370/336 |
| 2014/0010223 | A1* | 1/2014 | Wang | H04W 48/12 370/338 |
| 2014/0036898 | A1* | 2/2014 | Liu | H04W 76/023 370/338 |
| 2014/0328235 | A1* | 11/2014 | Merlin | H04L 1/18 370/311 |
| 2015/0124647 | A1* | 5/2015 | Jafarian | H04W 84/18 370/254 |
| 2015/0312753 | A1* | 10/2015 | Asterjadhi | H04W 4/06 370/329 |

(Continued)

*Primary Examiner* — Bunjob Jaroenchonwanit (57) ABSTRACT

Systems and techniques relating to partial AID length change notification include: transmitting, to one or more wireless devices within a wireless communication system, a first frame including an indication of a partial association identifier (AID) length and an indication of a target time at which the one or more wireless devices within the wireless communication system will utilize the indicated partial AID length; and transmitting, to the one or more wireless devices within a wireless communication system, one or more additional frames before the target time is reached, where each of the one or more additional frames include the indication of the partial AID length and the indication of the target time.

20 Claims, 6 Drawing Sheets

(56) References Cited

U.S. PATENT DOCUMENTS

| | | | | |
|---|---|---|---|---|
| 2015/0373642 | A1* | 12/2015 | Wong | H04L 1/0003 |
| | | | | 370/311 |
| 2017/0118602 | A1* | 4/2017 | Seok | H04W 56/00 |
| 2017/0188390 | A1* | 6/2017 | Adachi | H04L 5/0007 |
| 2017/0295588 | A1* | 10/2017 | Ahn | H04W 84/12 |
| 2017/0303268 | A1* | 10/2017 | Ghosh | H04L 5/0055 |

\* cited by examiner

PARTIAL ASSOCIATION IDENTIFIER (AID) LENGTH CHANGE NOTIFICATION

CROSS REFERENCE TO RELATED APPLICATION

This disclosure claims the benefit of the priority of U.S. Provisional Application Ser. No. 62/322,742 filed Apr. 14, 2016, entitled, "PARTIAL AID LENGTH CHANGE NOTIFICATION", which is incorporated herein by reference in its entirety.

BACKGROUND

This disclosure relates to wireless networking systems and techniques, in particular, to partial association identifier (AID) length change notification.

Wireless communication, particularly wireless local area network (WLAN) technology, has become ubiquitous in the mobile computing environment. Some existing wireless networking standards, for example, WiFi protocol IEEE (Institute of Electrical and Electronics Engineers) 802.11 can be used to provide wireless connectivity between wireless devices. In various mechanisms employed by some IEEE 802.11 standards, an identifier, referred to as a partial association identifier (AID), can be used to provide an identification of which wireless stations are intended as destinations for a communicated frame. It may be desirable to improve various capabilities related to partial AIDs, such as communication of a dynamic partial AID length, to potentially enhance these mechanisms and improve overall system performance.

SUMMARY

This disclosure relates to wireless networking systems and techniques, in particular, to partial AID length change notification.

According to an aspect of the described systems and techniques, a method includes: transmitting, to one or more wireless devices within a wireless communication system, a first frame including an indication of a partial association identifier (AID) length and an indication of a target time at which the one or more wireless devices within the wireless communication system will utilize the indicated partial AID length; and transmitting, to the one or more wireless devices within a wireless communication system, one or more additional frames before the target time is reached, where each of the one or more additional frames include the indication of the partial AID length and the indication of the target time.

According to another aspect of the described systems and techniques, an apparatus includes: a wireless transceiver; and circuitry coupled with the wireless transceiver, the circuitry configured to: transmit, to one or more wireless devices within a wireless communication system, a first frame including an indication of a partial association identifier (AID) length and an indication of a target time at which the one or more wireless devices within the wireless communication system will utilize the indicated partial AID length; and transmit, to the one or more wireless devices within a wireless communication system, one or more additional frames before the target time is reached, where each of the one or more additional frames include the indication of the partial AID length and the indication of the target time.

The described systems and techniques can result in one or more of the following advantages. The partial AID length change notification techniques may increase the reliability and accuracy of communicating partial AID length change information to multiple wireless stations (STAs). Moreover, the disclosed techniques utilize additional frames (e.g., non-beacon frames) for transmitting the partial AID length, which may result in improved efficiency of the frame exchange sequence (e.g., reduced potential of collisions). The partial AID length can be implemented dynamically, for example tuned based on the capabilities of STAs and/or an operational environment. Accordingly, the disclosed techniques potentially provide improved function of the network entities and increased media access control (MAC) efficiency.

BRIEF DESCRIPTION OF THE DRAWINGS

Like reference symbols in the various drawings indicate like elements.

DETAILED DESCRIPTION

Figure 1A:
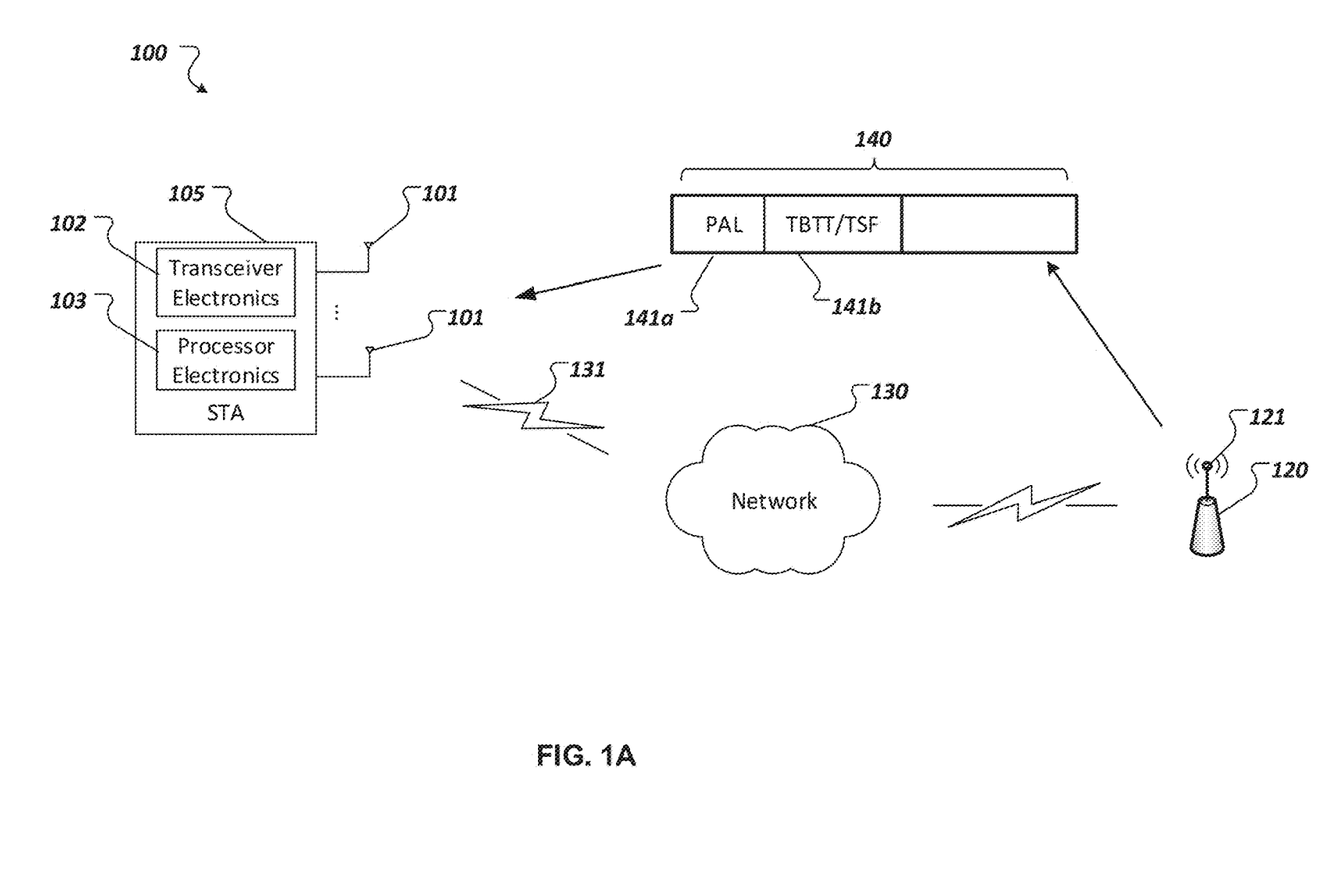
FIG. 1A shows an example of a wireless communication system for implementing partial AID length change notification techniques.

This disclosure relates to wireless networking systems and techniques, in particular, to partial AID length change notification techniques employed between wireless devices, such as wireless stations (STAs) and access points (APs). FIG. 1A shows an example of a wireless communication system 100 including wireless network 130. In the example of FIG. 1A, the wireless network 130 is implemented as a WLAN. As an example, the wireless communication system 100 is implemented as a basic service set (BSS) architecture according to IEEE 802.11 communication standard. The wireless communication system 100 can be employed to provide wireless connectivity for stationary, portable, and mobile devices within accessible range to establish wireless communication links 131, or channels, supported by the wireless network 130. The wireless communication system 100 includes components that interact with one another in order to provide an over-the-air (OTA) interface between STA 105 and AP 120. Although the wireless communication system 100 is shown as including STA 105, multiple STAs can be communicatively connected to network 130 supporting wireless communication between other STAs and with the AP 120.

The STA 105 can be a wireless communication device having circuitry that includes transceiver electronics 102 and processor electronics 103. The transceiver electronics 102 send and receive wireless signals over one or more antennas 101. The transceiver electronics 102 of STA 105 can possess the components, circuitry, and architecture necessary to support various wireless communication functions, for example, transmitting and/or receiving information via WiFi networking technology. In some implementations, the STA 105 includes dedicated circuitry configurations for transmitting and dedicated circuitry configurations for receiving.

The processor electronics 103 of STA 105 effect the wireless communications using the transceiver electronics 102. The processor electronics 103 of STA 105 can include one or more processors, such as a digital baseband processor and one or more additional dedicated processing units (e.g., a power management unit and audio codec). As an example, the processor electronics 103 can include a Digital Signal Processor (DSP), a MicroController Unit (MCU), and at least one memory device to hold data and potentially instructions for the processor electronics 103.

The AP 120 can be implemented as a wireless networking device including an antenna 121 to communicate with wireless devices, such as STA 105 and other components of the wireless network 130. AP 120 can be connected to additional network devices, such as routers and modems, for example, operating to further connect wireless devices to a wide area network (WAN), such as the Internet. The AP 120 can be employed to register STA 105, thereby allowing STA 105 to receive wireless communication services.

As shown in FIG. 1A, the system 100 includes a STA 105 that can be controlled by a configuration function that determines when a station can transmit and/or receive information via the network 130. In some implementations, AP 120 implements direct communication between the STA 105 and another device, such as point-to-point communication, where a wireless channel is allocated for the devices to communicate directly. The STA 105 can communicate with one or more other wireless communication devices and/or the AP 120 using one or more antennas 101 and one or more wireless transmission technologies. The wireless technologies employed can include near field communications (NFC), Bluetooth (BT), WiFi, as well as mobile phone technologies, such as WCDMA (Wideband Code Division Multiple Access), CDMA2000, UMTS (Universal Mobile Telecommunications System), GSM (Global System for Mobile communications), High Speed Packet Access (HSPA), and LTE (Long-Term Evolution, often referred to as 4G). In some implementations, the system 100 can also include various other wireless communication components, such as base stations (BS), additional APs, and wireless clients.

Moreover, the wireless communication system 100 supports the partial AID length change notification techniques described herein. In accordance with some existing wireless networking standards, a partial AID is used as a non-unique identifier of a STA. For example, in a downlink (DL) multiuser (MU) physical layer convergence procedure protocol data units (PPDU) transmission, resource unit (RU) allocation for a STA is identified using a partial AID of the STA. Different BSS deployments can correspondingly have different numbers of STAs that are associated with the AP. Accordingly, the number of STAs supported within the BSS architecture effects the number of STAs to be identified using the partial AID.

In some existing standards, such as IEEE 802.11ax, the partial AID length is implemented as a parameter having a dynamic, or otherwise variable, length (e.g., 11 bits or 6 bits) to be adjusted based on the STAs supported by the particular AP. As an example, in a case when the amount of STAs which supports DL MU operation in a BSS are more than a threshold (e.g., 64 STAs), the AP 120 can broadcast to the STAs, including STA 105, that a partial AID having, e.g., 11 bits, will be used in the HE-SIG-B. Alternatively, in an instance when the number of STAs which supports DL MU operation in a BSS is less than or equal to the threshold (e.g., 64 STAs), the AP 120 can determine that the partial AID is used to address fewer STAs, and subsequently broadcasts to the STAs that a shorter length partial AID, e.g., a 6-bit partial AID, will be used in the HE-SIG-B. In an embodiment, the AP is capable of announcing other partial AID lengths, e.g. 8-bit, 10-bit, per the number of STAs that associated with the AP.

To address these scenarios where it is determined by a wireless device, such as AP 120, for the BSS to switch to use of a new partial AID length, the disclosed partial AID length change notification techniques are employed. The AP 120 can transmit frame 140, which is formatted for use with the described techniques, to notify the associated STAs within the BSS, such as STA 105, of its decision to change to a different partial AID length. According to the disclosed techniques, STA 105, and other STAs associated with AP 120 within the system 100, are notified of the new partial AID length before the BSS actually switches the wireless communication configuration to support to the newly applied partial AID length. Thus, the disclosed techniques allow time for the AP to ensure that the STAs are successfully notified of the partial AID length change. For example, in using beacon frames to communicate the partial AID length value, the AP 120 is configured to perform multiple beacon transmissions of the new partial AID length, before implementing the partial AID length update within the BSS. Consequently, the techniques realize a solution that increases reliability and accuracy of partial AID length change announcement procedures (e.g., reduces errors/discrepancies associated with different STAs having different values for partial AID length).

FIG. 1A illustrates AP 120 transmitting a frame 140 including partial AID length (PAL) indication 141*a* and target beacon transmission time or time synchronization function (TBTT/TSF) indication 141*b* to STA 105. Accordingly, via frame 140, the AP 120 communicates to the STA 105 both the new partial AID length value, and an effective time when the BSS is designated to switch to use of the transmitted PAL value. The AP 120 can transmit the frame 140 as a broadcast to STA 105 and its associated STAs. In some cases, the frame 140 can be transmitted by AP 120 as a multicast transmission or a unicast transmission.

In some implementations where the PAL is selected between two different lengths, the PAL indication 141*a* is implemented as a 1-bit field and used to convey whether the partial AID length will be, for example, 11 bits or 6 bits. For instance, PAL indication 141*a* can be set to a value of "0" signaling that the AP 120 is announcing a change to a 11-bit PAL, or set to a value of "1" signaling a change to a 6-bit PAL.

In cases where the AP 120 has determined to dynamically adjust the partial AID length, frame 140 is employed to announce this change to its associated STAs, and the PAL value included in PAL indication 141*a* conveys a different length than a partial AID length that is currently utilized by the network devices in the system 100. As an example, if the BSS is presently configured to support 11-bit partial AID, then AP can transmit the frame 140 to the STA 105 with the PAL indication 141*a* set to a value indicating a switch to a 6-bit partial AID length. Thereafter, STA 105 receives frame 140 from AP 120, and the STA 105 can decode the frames' contents in order to determine the new partial AID length as designated by the AP 120. In response to the STA 105 receiving frame 140, the STA 105 can perform functions to support wireless communication in accordance with the changed partial AID length, such as configuring any suitable device circuitry (e.g., transceiver electronics, processor electronics, and the like), as deemed necessary or appropriate.

In the example shown in FIG. 1A, frame 140 is implemented as a beacon frame. AP 120 can periodically transmit beacon frames to STA 105 and other wireless devices of system 100, and advertise its presence, capabilities, and configuration information, including the partial AID length. According to existing wireless networking standards, AP 120 can be configured to transmit beacon frames to STA 105 at a specified time, or at specified beacon intervals from another consecutively transmitted beacon frame. Thus, after the AP 120 determines to implement a partial AID length change, it can transmit frame 140 to STA 105 at the next occurring beacon frame interval. In some instances, the TBTT/TSF indication 141b is used to designate a number of beacon intervals in a time period after which the BSS will use the new partial AID length conveyed by PAL indication 141a. The TBTT/TSF indication 141b can be generally characterized as conveying a time period that elapses after the AP 120 initially announces the partial AID length change (e.g., transmitting frame 140), and prior to the BSS switching to the new partial AID length. The AP 120 is configured to transmit multiple additional frames, such as a plurality of beacon frames, for re-communicating the indications 141a, 141b to the wireless devices associated with the AP 120, including STA 105. Additionally or alternatively, the AP 120 is configured to transmit other management frames, such as partial AID length notification frames, to STA 105 during the time prior to the BSS implementing the new partial AID length. Thus, the AP 120 communicates the partial AID length changing aspects of the techniques described using various mechanisms.

In some implementations, a wireless device in the BSS, such as STA 105, maintains a copy of a timing synchronization function (TSF), which is a local timer synchronized with the TSF of other wireless devices in the basic service area. The AP 120 is capable of using the TBTT/TSF indication 141b within frame 140 to announce its PAL related timing information. As the AP 120 transmits frame 140 to STA 105, the indication 141b announces an effective time in which the BSS will use the partial AID length designated in the PAL field. In employing the TBTT/TSF indication 141b, the AP 120 can transmit beacon frames for any number of intervals until the time indicated by the TSF is reached.

Alternatively, in some cases, the TBTT/TSF indication 141b can specify that the new partial AID length is to be used immediately upon reception of the notifying frame 140 by the STA 105. As an example, setting the TBTT/TSF indication 141b to a value of "0" can preclude a required wait period, and specify that the BSS can switch to the PAL value included in 141a right away. In some implementations, the AP 120 is configured to utilize various mechanisms to determine, or otherwise adjust, values for the indications 141a, 141b that are suitable for the desired operation of the system 100 as deemed necessary or appropriate.

In an implementation, after the TSF time reaches the announced TBTT/TSF, the new announced partial AID length takes effect. In one embodiment, if the AP announces a partial AID length n, then the AP uses each DL MU receiver's n-LSB (least significant bits) AID to identify the receiver's DL RU. Accordingly, the client station (i.e., STA) uses its n-LSB (least significant bits) AID to match the DL MU RU which has been designated to it, as discussed in detail in reference to FIG. 4.

In some implementations, frame 140 is formatted to include a partial AID length change element. The partial AID length change element is configured to implement the length change notification aspects using a partial AID length field for conveying the PAL indication 141a and the TBTT/TSF indication 141b. In embodiments using the partial AID length change element, frame 140, including the element, can be implemented as a beacon frame, probe response, or partial AID Length Notification action frame. In other implementations, the frame 140 is formatted to implement the partial AID length change aspects in an HE Control field (shown in FIG. 2). In accordance with this implementation, frame 140 using the HE Control field can be a data/management frame or a control frame.

For the purposes of illustration, the PAL indication 141a and TBTT/TSF indication 141b are shown proximately together; however, it should be appreciated that FIG. 1A intends to generally illustrate that the techniques herein are capable of enhancing partial AID length change procedures by using PAL and timing indications in a shared frame, and not necessarily a frame limited to the fields of the particularly shown format and/or ordering of fields (or subfields). Additional detail regarding an example of a format of the frame 140 used to implement the techniques is discussed in reference to FIG. 2.

Figure 1B:
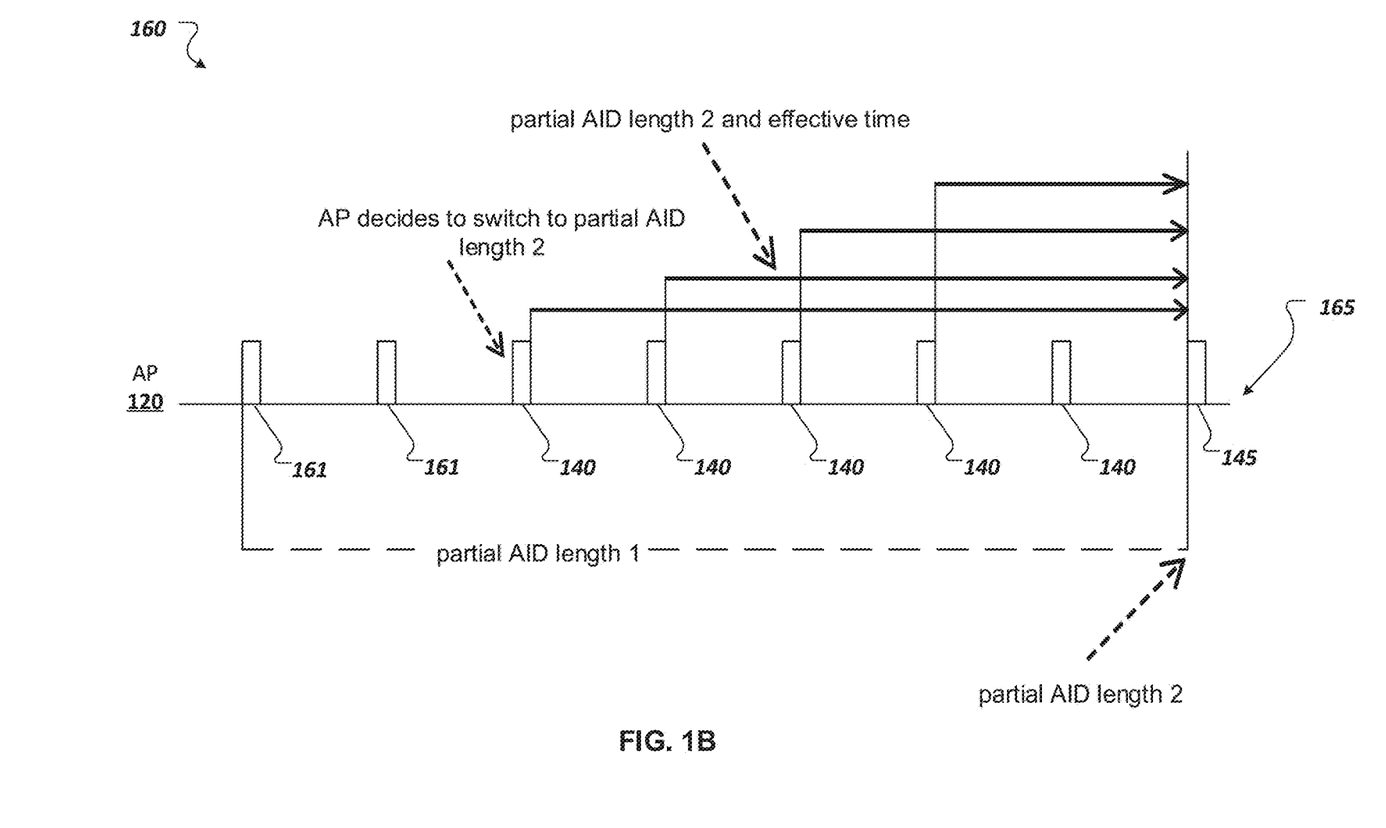
FIG. 1B shows a diagram of frames (e.g., beacon frames) communicated by an access point (AP) implementing partial AID length change notification techniques.

FIG. 1B shows a diagram 160 of frames transmitted from the AP 120 implementing partial AID length change techniques utilized within a wireless communication system 100 shown in FIG. 1A. It should be noted that the frames transmitted generally corresponds to the frames communicated from the AP 120 to the STA 105 illustrated in, and discussed in reference to, FIG. 1A. As illustrated, frame sequence 165 can be generally described as showing the AP 120 transmitting multiple beacon frames 161 and 140. As previously discussed, the AP 120 can be configured to transmit each of the beacon frames, having specified beacon intervals (BIs) between frames. In some cases, each of the beacon frames 161, 140 are transmitted during a respective broadcast transmission, where the transmitted beacon frame is sent to all of the STAs that are associated to the AP 120 within a BSS, for example. In some implementations, beacon frames 161 do not include partial AID length change related information (e.g., PAL and TBTT/TSF indications), and beacon frames 140 include the partial AID length change related information (e.g., PAL and TBTT/TSF indications) as described above.

Frame sequence 165 starts with the AP 120 transmitting beacon frames 161, at successive BIs, while a current partial AID length 1 is being utilized by the BSS. In some instances, the AP 120 is configured to use a robust modulation and coding scheme (MCS) rate to transmit the beacon frames 161, 140. Thus, there is an increased probability of the STA successfully receiving the beacon frames 161, 140 and subsequently decoding the beacon frames 161, 140 correctly (e.g., no collision). Thereafter, it is illustrated that the AP 120 decides to switch to using a new partial AID length, which is partial AID length 2. Subsequent to the AP's determination, for instance at the next occurring beacon interval, it transmits an initial beacon frame 140 for notifying, or otherwise announcing, the change to partial AID length 2. The beacon frame 140 includes the partial AID length change information by including the new partial AID length value (i.e., partial AID length 2) and the effective TBTT or effective TSF time. The general format of the beacon frame 140 is shown in FIG. 1A. As shown in FIG. 1B, the AP 120 announces that the partial AID length is to be changed prior to the BSS actually switching to the new partial AID length 2. In particular, frame sequence 165 involves transmitting beacon frame 140, including the new PAL value (i.e., partial AID length 2), to be received by at least one STA while the previous partial AID length (i.e., partial AID length 1) is still being utilized by the BSS.

Moreover, frame sequence 165 illustrates the timing aspects of the techniques, involving employing a target time for implementing the new PAL value. The example shown employs the TBTT implementation, where the AP 120 defines a time period elapsing before the BSS implements use of the partial AID length 2 by designating a number of BIs within the time period. In the illustrated example, the time period between initially announcing the change to partial AID length 2 and the BSS switching to using partial AID length 2 includes five successive BIs. Thus, according to the techniques, the beacon frames 140 transmitted by the AP 120 are formatted to have the TBTT indication set to convey the number of BIs (e.g., 5) after which the BSS updates to support the transmitted new PAL value, that is partial AID length 2.

Additionally, each BI transmitted during the time period prior to implementing the partial AID length change is used by the AP 120 to re-transmit the new partial AID length and the target time information. At each BI occurring before the BSS switches to partial AID length 2, the AP 120 transmits a beacon frame 140 to STAs including a PAL value indicating the new partial AID length 2, and indicating the effective TBTT for using the new PAL. Thereafter, the frame sequence 165 illustrates that at the effective TBTT (or TSF time), which occurs at the fifth successive BI corresponding to frame 145 in this example, the BSS implements the new partial AID length 2. Also, the number of intervals indicated by the TBTT is decremented at each successive interval. For instance, in the next BI, the TBTT value included in the next transmitted beacon frame 140 will indicate that four BIs remain prior to the BSS implementing the new PAL value. Thereafter, the beacon frame 140 transmitted in the following BI would indicate three remaining BIs until implementing the new PAL value, and so on, until the end of the time period is reached. Accordingly, the AP 120 is allowed time to re-broadcast the updated partial AID length information to its associated STAs, by transmitting multiple beacon frames 140 before the BSS changes to using the new partial AID length. Thus, the techniques described can improve reliability in transmitting partial AID length change information between wireless devices, and reduce the potential of loss or damaged information. In an embodiment, before beacon frame 145 is transmitted, the AP uses DL MU receiver's partial-length-1 LSB partial AID to announce the receiver's DL RU defined in HE SIG-B. After beacon frame 145 is transmitted, the AP uses DL MU receiver's partial-length-2 LSB partial AID to announce receiver's DL RU defined in HE SIG-B. In another embodiment, before beacon frame 145 is received by the client station (i.e., STA), the STA uses its partial-length-1 LSB partial AID to determine its DL RU defined in HE SIG-B. Then, after beacon 145 frame is received, the client station, namely an STA, uses its partial-length-2 LSB partial AID to its DL RU defined in HE SIG-B.

Figure 1C:
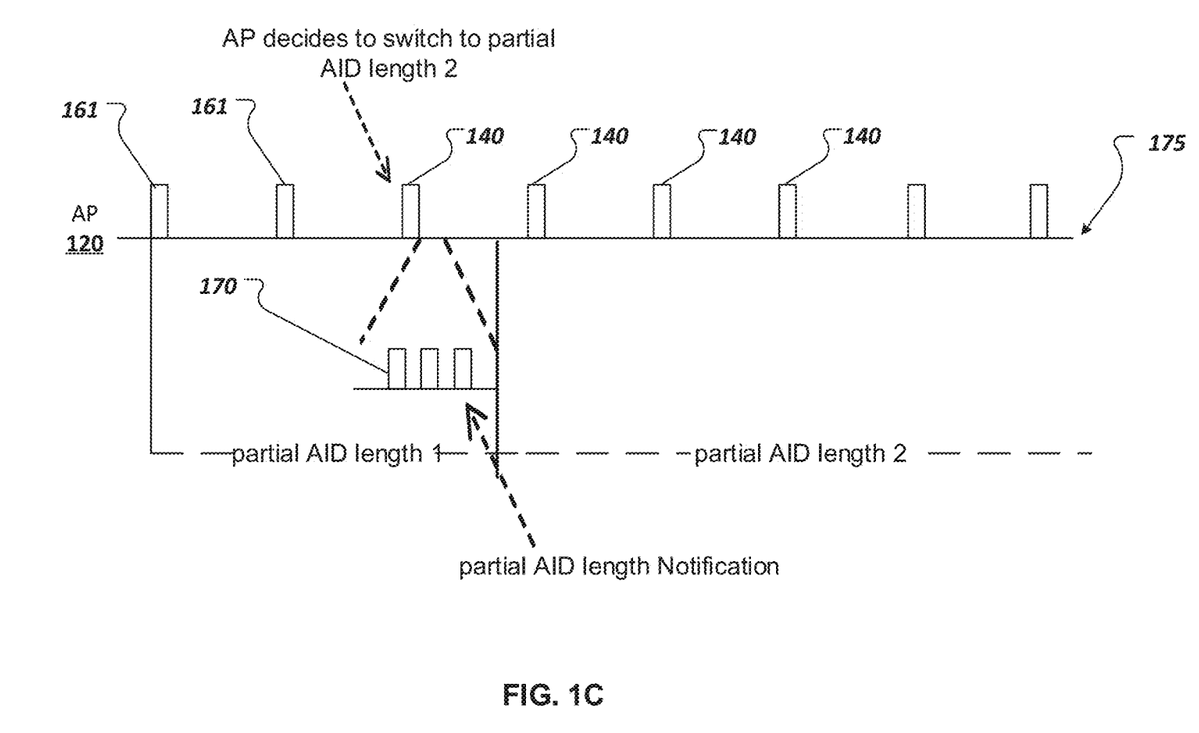
FIG. 1C shows another example of frames (e.g., partial AID length notification) communicated by an AP implementing partial AID length change notification techniques.

FIG. 1C shows another example of frames, including partial AID length notifications, communicated by an AP implementing partial AID length change notification techniques. As similarly discussed in reference to FIG. 1B, the AP 120 is configured to transmit multiple beacon frames 161, 140, at respective BIs, to be received by STAs. Frame sequence 175 shows the AP 120 transmitting multiple beacon frames 161 while the BSS uses a partial AID length 1, and before the AP decides to switch to supporting a new length for the partial AID, namely partial AID length 2.

When the AP decides to switch to a new partial AID length 2 and before changing to the new partial AID length 2, the AP transmits a beacon frame 140. In addition to transmitting the beacon frame 140, the AP 120 transmits other management frames to communicate the partial AID length change information to its STAs. As illustrated, after a beacon frame 140 is transmitted, the AP 120 then sends partial AID length notification frames 170 to be received by the STAs. The partial AID length notification frames 170 are transmitted sequentially by the AP, in some cases. In other instances, the partial AID length notification frames 170 can be combined with beacon frame transmissions from the AP. In an embodiment, the partial AID length notification frames 170 are formatted to include similar fields, or information, relating to the new PAL value as conveyed by beacon frame 140. That is, the partial AID length notification frames 170 can include a PAL value indicating partial AID length 2, and the effective TBTT or TSF time. Frame sequence 175 shows that after AP 120 transmits the partial AID length notification frames 170 to its associated STAs, the BSS switches to utilizing the new partial AID length 2 right away. Subsequently, the AP 120 transmits multiple beacon frames 140, while the partial AID length 2 is currently implemented by the devices within the BSS.

Figure 2:
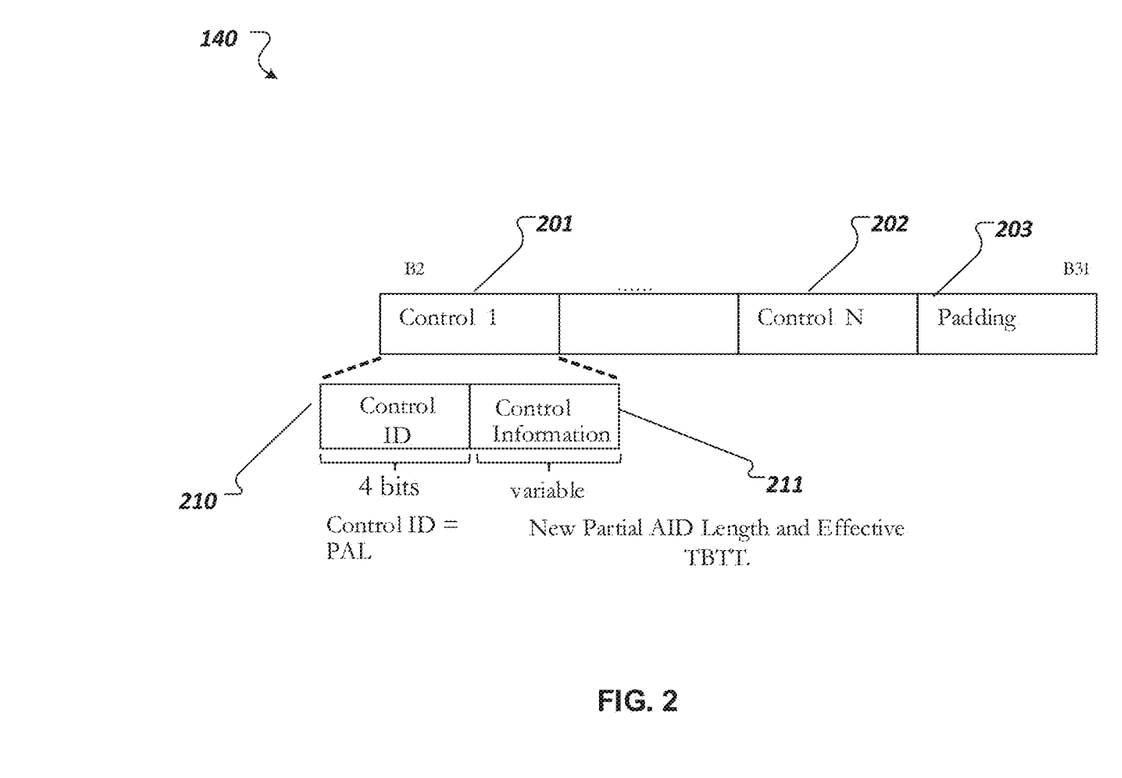
FIG. 2 shows an example of a format for a header of a frame (e.g., Aggregated Control field in HE variant HT Control field) used for implementing partial AID length change notification techniques.

FIG. 2 shows an example of a format for a header of a frame 140, for example, an Aggregated Control field (in HE variant HT Control field) in the MAC header of a frame for implementing the partial AID length change techniques described. It should be appreciated that FIG. 2 is intended to show a format corresponding to a portion of a frame, for example, the Aggregated Control field (in HE variant HT Control field) in the MAC header of the frame 140, rather than the frame in its entirety. The header of the frame 140 includes the Aggregated Control field shown in FIG. 2 implemented in the HE variant HT Control field in the MAC header of a MPDU that is formatted, or otherwise configured to allow for implementing at least the partial AID length change. That is, the illustrated MAC header of frame 140 is formatted to use a field, control 1 field 201 in the Aggregated Control field (in HE variant HT Control field), to include the partial length change notification information. As shown in FIG. 2, the Aggregated Control field in the MAC header of frame 140 has a format that contains one or more fields including, but not limited to: control 1 field 201; control N 202; and padding 203 in Aggregated Control field (in HE variant HT Control field).

Additionally, as shown in FIG. 2, the control 1 field 201 in Aggregated Control field (Control 1, . . . Control N, padding) of HE variant HT Control field of the header can further include multiple fields, or subfields. As illustrated, the control 1 field 201 can further contain subfields including, but not limited to: control ID 210; and control information 211, having a variable bit length which is used to convey the new PAL and effective TBTT/TSF. In some implementations, Control ID 210 indicates that PAL follows Control ID field. Also, in some implementations, control information 211 implements the PAL indication as a 1-bit field to indicate whether an 11-bit or 6-bit length is employed for the partial AID, and the effective TBTT as a value indicating the number of BIs after which the BSS will use the new PAL indicated. Additionally, the Aggregated Control field (in HE variant HT Control field) shown in FIG. 2 is implemented in the MAC header of a DATA/MAN- AGEMENT or CONTROL frame that is formatted, or otherwise configured, for implementing the partial AID length change aspects in the HE Control field.

Figure 3:
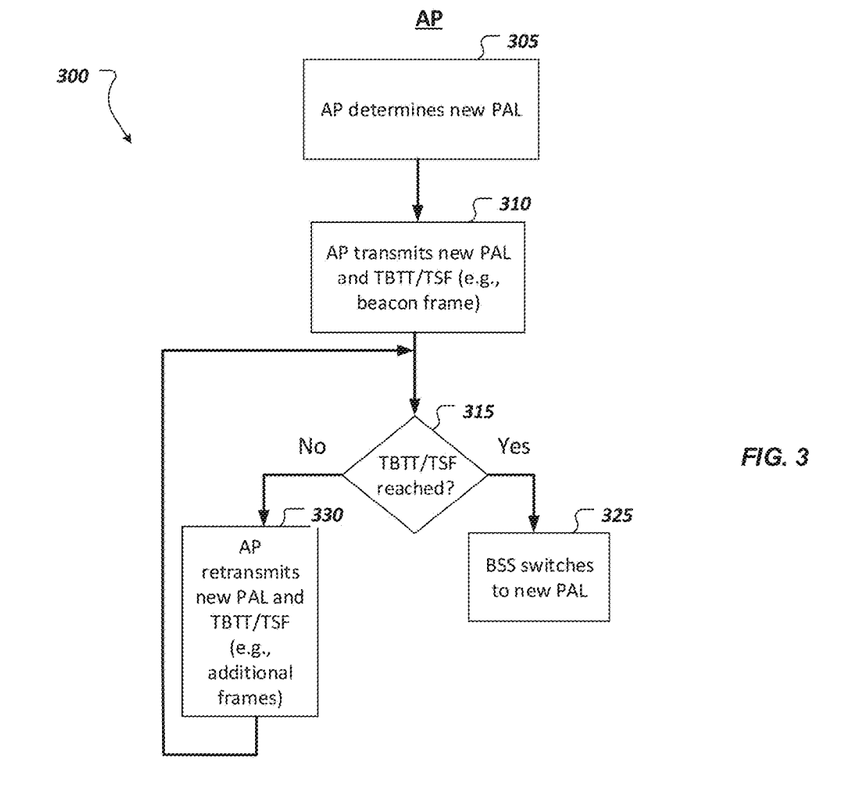
FIG. 3 shows a flow diagram of an example of a process performed by an AP implementing partial AID length change notification techniques.

FIG. 3 shows a flow diagram of an example of a process 300 performed by a wireless device, such as an AP, to implement partial AID length change notification techniques. Various implementations of the disclosed partial length change notification techniques, which relate to the procedure 300, are also discussed in detail in reference to FIGS. 1A-1B. The processes 300 involves a procedure for an AP to notify its associated STAs of a change to the partial AID length, before the BSS actually switches its implementation to support the new partial AID length.

The process 300 begins at 305, with the AP, determining that a new length for partial AIDs is to be employed by wireless devices within the BSS. For example, the AP can make the determination to change to a new partial AID length in response to the amount of STAs that are in operation in a BSS increasing/decreasing to a number that is greater/less than a threshold, and thereby necessitating a longer/shorter AID length (e.g., increasing AID length to 11-bits).

At 310, based on the determination, the AP, communicating via a wireless network, can transmit the new partial AID length and target time information for switching to use of the new partial AID length to at least one of its associated STAs. In some implementations, the AP conveys the information using new PAL and TBTT/TSF indications included in a beacon frame that is transmit during broadcast transmissions to all of its associated STAs. In other implementations, the AP transmits the information within the HE Control field of DATA/MANAGEMENT or CONTROL frames. The transmitting at 310 involves the AP transmitting an initial frame notifying the wireless devices within the BSS, during a time period before the BSS performs the switch to the new PAL indicated in the transmitted frame.

Subsequent to transmitting the initial frame to announce the partial AID length change, the AP performs a check at 315. At 315, the AP checks whether the time period relating to a target time for implementing the partial AID length change, indicated by the TBTT or the TSF within the frame transmitted at 310, has been reached or otherwise elapsed. In some implementations, the check 315 is performed iteratively at specified times, or intervals, such as at BIs.

In instances where the AP determines that the target time has been reached, shown as "Yes" in FIG. 3, the process proceeds to 325 where the BSS switches to the new partial AID length conveyed by the new PAL indicated in the initial beacon frame.

In the case that the target time has not been reached, illustrated as "No" in FIG. 3, the AP determines that the time period prior to switching to the new length has not elapsed and the process proceeds to 330. At 330, the AP can use the next interval during this time, for example at the next BI or other notification interval, to retransmit the new PAL and TBTT/TSD by including the information in an additional frame transmitted to STAs. In some cases, the AP transmits the partial AID length change information within beacon frames. In some cases, the AP can also transmit the AID length change information to STAs using MANAGEMENT frames, such as Partial AID Length Notification action frames. As illustrated, the check 315 and re-transmission of partial AID length change information at 330 is performed one or more times until the TBTT or TSF time is determined to be reached. In some instances, the TBTT/TSF indication included in frames transmitted by the AP can have a value (e.g., "0") designating that the new PAL is to be immediately utilized by the BSS. Additionally, as discussed in detail above, the number of intervals indicated by the TBTT is decremented at each successive interval, until the end of the time period is reached.

In some cases, various power save mechanisms, such as Target Wake Time (TWT) are implemented for wireless devices within the wireless network. In these scenarios, STAs that are operating in a power save mode may not receive communication from the AP, such as beacon frames. Accordingly, in some implementations, the AP is configured to transmit frames implementing the partial AID length change aspects, at 310 and 330, for instance, during a TWT. During the TWT, the AP can perform communication with its associated STAs as necessary to notify the STAs, such as broadcasting Partial AID Length Notification frames and transmitting frames with HE Control field including the PAL and TBTT/TSF indications.

Figure 4:
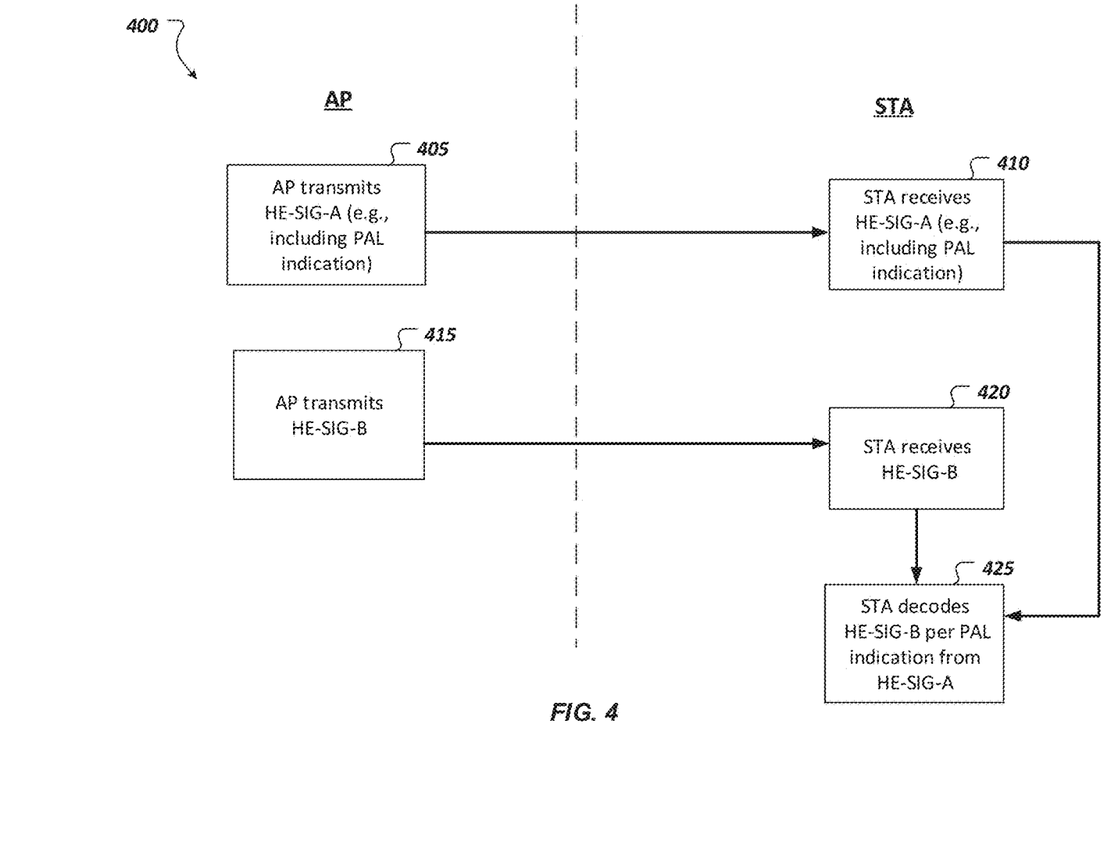
FIG. 4 shows a flow diagram of an example of processes performed by an AP and a STA implementing partial AID length change notification techniques.

FIG. 4 shows a flow diagram of an example of processes 400 performed by an AP and a STA implementing partial AID length change notification techniques through HE-SIG-A and HE-SIG-B. In some implementations, HE-SIG-B fields of a PPDU used for DL RU allocation, for example, includes information that is specified per STA. HE-SIG-A fields of the PPDU can include information that is common to each of the STAs which are identified by the HE-SIG-B parameters. Accordingly, process 400 involves leveraging the fields associated with HE-SIG, including information that is common to, and thus communicated to, multiple STAs to also notify these STAs of the partial AID length change.

At 405, the AP can transmit partial AID length change information to its associated STAs, using the HE-SIG-A field. In an embodiment, the AP is configured to transmit to at least one STA, a HE-SIG-A field including a PAL field (e.g., 1-bit) indicating whether the BSS is updating its support to either one of a 11-bit or 6-bit AID length. At 410, the STA receives the HE-SIG-A field. Thereafter, the AP transmits a HE-SIG-B field 415 to at least one STA. The AP is configured to transmit the HE-SIG-A and the HE-SIG-B to the same STAs. At 420, the STA receives communication of the HE-SIG-B field from the AP. As a result, the STA has received both the HE-SIG-A and the HE-SIG-B field communicated by the AP. For purposes of illustration, the HE-SIG-A and HE-SIG-B fields are described as separate transmissions, however it should be appreciated that both the HE-SIG-A and HE-SIG-B fields can be transmitted together, such as within the same transmission opportunity or included in the same PPDU.

At 425, after receiving both the HE-SIG-A and HE-SIG-B fields, the STA can decode the HE-SIG-B using the partial AID length (specified per STA) in the HE-SIG-A. In some implementations, the HE-SIG-B fields include common information to all STAs that receive the DL MU PPDU for instance. Thus, the AP can transmit the HE-SIG-B common information field including the PAL field of the aspects. The AP also transmits the HE-SIG-B with RU allocation information in per user info for each DL MU receiving STA identified by PAL LSB AID of the receiving STA. Subsequently, the STA can receive the HE-SIG-B from the AP, and decode using the new PAL indicated within the HE-SIG-B fields. Then the STA uses its PAL LSB AID to find its DL MU RU where to decide its frames. In some implementations of the processes 400, dedicated announcements of the partial AID length change is not required, as discussed in relation to previously disclosed partial AID length change notification techniques (e.g., beacon frames, partial AID Length Notification action frames, and HE Control field).

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Other implementations fall within the scope of the following claims.

What is claimed is:

1. A method comprising:
   transmitting, to one or more wireless devices within a wireless communication system, a first frame including an indication of a partial association identifier (AID) length and an indication of a target time at which the one or more wireless devices within the wireless communication system will utilize the indicated partial AID length; and
   transmitting, to the one or more wireless devices within a wireless communication system, one or more additional frames before the target time is reached, where each of the one or more additional frames include the indication of the partial AID length and the indication of the target time.

2. The method of claim 1, wherein transmitting the first frame and transmitting the one or more additional frames is performed while the one or more wireless devices are utilizing a previous partial AID length that is different than the indicated partial AID length.

3. The method of claim 2, wherein the first frame comprises a beacon frame, and the one or more additional frames comprise a beacon frame.

4. The method of claim 3, wherein the indication of the target time is a target beacon transmission time (TBTT), and each of the one or more additional frames are transmitted at a beacon interval prior to the TBTT.

5. The method of claim 3, wherein the one or more additional frames further comprise a management frame.

6. The method of claim 3, wherein the first frame comprises a partial AID element including the indication of the partial AID length and the indication of the target time.

7. The method of claim 4, wherein the indication of the partial AID length includes a value designating one of an 11-bit partial AID length or a 6-bit partial AID length.

8. The method of claim 1, wherein the first frame comprises a HE Control field that includes the indication of the AID length and the indication of the target time.

9. The method of claim 8, wherein transmitting the first frame is performed within a target wake time interval associated with powering on a wireless device of the one or more wireless devices within the wireless communication system.

10. The method of claim 1, wherein the first frame comprises a HE-SIG field indicating common control information associated with the one or more wireless devices within the wireless communication system, and the HE-SIG field includes the indication of the partial association identifier (AID) length and the indication of the target time.

11. An apparatus comprising:
   a wireless transceiver; and
   circuitry coupled with the wireless transceiver, the circuitry configured to:
      transmit, to one or more wireless devices within a wireless communication system, a first frame including an indication of a partial association identifier (AID) length and an indication of a target time at which the one or more wireless devices within the wireless communication system will utilize the indicated partial AID length; and
      transmit, to the one or more wireless devices within a wireless communication system, one or more additional frames before the target time is reached, where each of the one or more additional frames include the indication of the partial AID length and the indication of the target time.

12. The apparatus of claim 11, wherein the circuitry is configured to transmit the first frame and transmit the one or more additional frames while the one or more wireless devices are utilizing a previous partial AID length that is different that the indicated partial AID length.

13. The apparatus of claim 12, wherein circuitry is configured to transmit the first frame as a beacon frame, and transmit the one or more additional frames as one or more beacon frames.

14. The apparatus of claim 13, wherein the circuitry is configured to transmit the indication of the target time as a target beacon transmission time (TBTT) and to transmit each of the one or more additional frames at a beacon interval prior to the TBTT.

15. The apparatus of claim 13, wherein circuitry is configured to transmit the one or more additional frames as one or more management frames.

16. The apparatus of claim 11, wherein the circuitry is configured to transmit the first frame comprising a partial AID element including the indication of the partial AID length and the indication of the target time.

17. The apparatus of claim 11, wherein the circuitry is configured to transmit the indication of the partial AID length as a value designating one of a 11-bit partial AID length or a 6-bit partial AID length.

18. The apparatus of claim 11, wherein the circuitry is configured to transmit the first frame comprising a HE Control field that includes the indication of the partial association identifier (AID) length and the indication of the target time.

19. The apparatus of claim 18, wherein the circuitry is configured to transmit the first frame within a target wake time interval associated with powering on a wireless device of the one or more wireless devices within the wireless communication system.

20. The apparatus of claim 11, wherein the circuitry is configured to transmit the first frame comprising a HE-SIG field indicating common control information associated with the one or more wireless devices within the wireless communication system, and the HE-SIG field includes the indication of the AID length and the indication of the target time.

* * * * *